US005295571A

United States Patent [19]

Van Den Bogaert et al.

[11] Patent Number: 5,295,571

[45] Date of Patent: Mar. 22, 1994

[54] METHOD FOR CONTINUOUSLY CONTROLLING AN ENDLESS BAND AND MACHINE FOR CARRYING OUT THIS METHOD

[75] Inventors: Jean-Francois X. A. Van Den Bogaert; Pierre P. Pascolo; Gerard X. Ringenbach, all of Cernay, France

[73] Assignee: Rollin S.A., Cernay, France

[21] Appl. No.: 820,456

[22] Filed: Jan. 9, 1992

[30] Foreign Application Priority Data

Feb. 20, 1991 [FR] France ................................ 91 02041

[51] Int. Cl.$^5$ ............................................ B65G 43/00

[52] U.S. Cl. .................................. 198/502.1; 198/810

[58] Field of Search .............................. 198/502.1, 810

[56] References Cited

U.S. PATENT DOCUMENTS 3,559,568 2/1971 Stanley .
4,372,172 2/1983 Gombócz et al. .............. 198/810 X
4,437,563 3/1984 Oriol .................................. 198/810
4,690,051 9/1987 Kishine et al. .
5,096,044 3/1992 Biebel ............................ 198/810 X

FOREIGN PATENT DOCUMENTS 0257417 6/1988 Fed. Rep. of Germany ... 198/502.1
2453096 9/1979 France .
1114598 9/1984 U.S.S.R. ............................. 198/810

*Primary Examiner*—D. Glenn Dayoan
*Attorney, Agent, or Firm*—Craig K. Leon; William L. Baker

[57] ABSTRACT

An apparatus and method for continuously controlling an endless belt, the belt being driven at a constant rate around at least two rollers spaced apart from each other, marking the belt while it is being driven to obtain successive marks and measuring distances between the successive marks while the belt is being driven. The rate of belt movement is changed in accordance with the distances measured.

19 Claims, 4 Drawing Sheets

METHOD FOR CONTINUOUSLY CONTROLLING AN ENDLESS BAND AND MACHINE FOR CARRYING OUT THIS METHOD

The subject of the present invention essentially is a method of continuously controlling an endless belt in particular a belt adapted to carry along a fabric having to receive successive printings the shift of which should be zero or reduced to a minimum to thus retain the aestetic appearance of the printed fabric.

This invention is also directed to a machine for continuously controlling an endless belt for carrying out this method.

BACKGROUND OF THE INVENTION

It is known that textile printing machines generally comprise an endless cloth or belt surrounding two cylinders one of which is rotated and above which belt are arranged successive printing cylinders or flat screens adapted to print patterns of different colors onto a fabric web carried along by the belt and sandwiched between this belt and the printing cylinders.

The endless cloth or belt generally has a sandwich-like structure with several more or less thick layers of elastomeric material, of fabric etc adapted to permit the printing of the fabric resting upon the belt through compression of the printing cylinders or flat screens upon the fabric.

The endless belt is of course driven with a constant speed by the travelling speed of the belt however remains irregular in spite of all in view of the possible local defects or variations in the inner structure of this belt, these structural defects or variations imparting a somewhat variable resiliency to the belt.

It results therefrom a "shift" or "registering inaccuracy" of the colored patterns printed in overlying relationship onto the fabric disposed upon the endless cloth or belt by the successive printing cylinders or flat screens.

Such a registering inaccuracy may reach a few tenths of a millimiter which is detrimental to the appearance of the fabric. A registering inaccuracy which is greater than about one tenth of a millimeter may indeed not be tolerated.

Therefore it is essential to very accurately control the local travelling speed of the endless cloth or belt in order that the registering inaccuracy of the fabric does not exceed the value referred to hereinabove since otherwise the said belt could not be suited to a fabric printing machine and should be discarded.

Heretofore to control the accuracy of the printings people were satisfied to watch with a magnifying glass for instance directly on the printing machine whether there was a registering inaccuracy between two patterns printed onto the fabric.

As it will be appreciated such a method is empirical, not very reliable, of time-consuming performance and expensive in labour.

It is therefore appropriate to propose a method of and a machine for continuously controlling an endless belt which would permit to ensure a registering inaccuracy equal to zero or reduced to an admissible minimum when the said belt is fitting a fabric printing machine.

The present invention achieves that goal.

SUMMARY OF THE INVENTION

For that purpose the subject of the invention is a method of continuously controlling an endless belt for instance adapted to carry along a fabric having to receive successive printings and the registering inaccuracy of which should be zero or reduced to a minimum, characterized in that it consists in periodically depositing drops of a colorant such for instance as ink upon a stretched side of the belt driven at a constant speed, continuously measuring the distances between two drops and comparing these distances to a reference value for thus controlling the regularity of the local instant travelling speed of the belt and accordingly its structural homogeneousness.

An embodiment of this method consists in periodically and simultaneously depositing upon the stretched side of the belt two spaced drops of colorant coming from an upstream injection system and from a downstream injection system so as to obtain successive groups of adjacent drops on the stretched side of the belt and continuously measuring downstream of the downstream injection system the spacing between these two adjacent drops to allow the very precise measurement of the registering inaccuracies which would be obtained on a fabric carried along and printed by means of the said belt.

More specifically each measured value of spacing between the two aforesaid adjacent drops are stored and then the mean value of the various measured spacings are computed and the difference between the instant spacing measured and the said mean value is made.

Another embodiment of the method according to this invention consists in periodically depositing onto the stretched side of the belt one drop of colorant coming from one single injection system so as to obtain a succession of drops on the stretched side of the belt and continuously measuring downstream of the injection system the spacings between the successive drops to determine the average value of the position of the neutral axis in the belt.

If the position of the neutral axis in the belt is substantially constant, one will then be sure that the travelling velocity of the said belt will also be substantially constant and therefore this belt will be suitable for printing a fabric without any registering inaccuracy defects. It should also be pointed out that the precise knowledge of the position of the neutral axis will allow the operator of the textile printing machine to preset the said machine so as to obtain the required printing accuracy.

The invention is also directed to a machine for carrying out the method meeting either one of the characterizing features referred to hereinabove, this machine being of the type comprising a frame supporting two cylinders adapted to rotate an endless belt to be controlled and being characterized in that the same frame carries above the belt at least one colorant injection system and at least one camera connected to a computer whereas an encoder is mechanically connected to the output shaft of a motor drivingly rotating one of the two cylinders and is electrically connected to the said injection system and to the said camera.

According to another characterizing feature of this machine onto the said frame is mounted in rolling, gear-meshing or the like relationship a first gantry located towards the cylinder driven by the motor and supporting a first colorant injection system as well as two cameras and a second gantry located towards the other cylinder and supporting a second colorant injection system.

It should be specified here that the aforesaid other cylinder is removably mounted onto a carriage also rolling on or meshing with the frame and adapted to pass under both aforesaid gantries.

According to still another characterizing feature of this machine the cylinder driven by the motor is removably mounted onto a support fastened onto the frame and carrying the aforesaid motor and encoder.

The machine according to this invention is further characterized in that it is operatively associated with a fabric printing machine or the like for controlling the speed thereof.

In other words the printing machine itself may comprise all the means according to this invention for performing the continuous control of the instant travelling speed of the endless belt which carries along the fabric to be printed.

BRIEF DESCRIPTION OF THE DRAWINGS

Now further advantages and characterizing features of the invention will better appear in the detailed description which follows and refers to the accompanying drawings given by way of example only and wherein.

DETAILED DESCRIPTION OF THE PREFERRED EMBODIMENT

With more particular reference to FIG. 1 there is seen a machine according to the invention allowing to continuously control the local travelling speed of an endless belt B adapted to later permit the printing of any patterns whatsoever onto a web of fabric (not shown) resting upon and carried along by the said belt.

Figure 1:
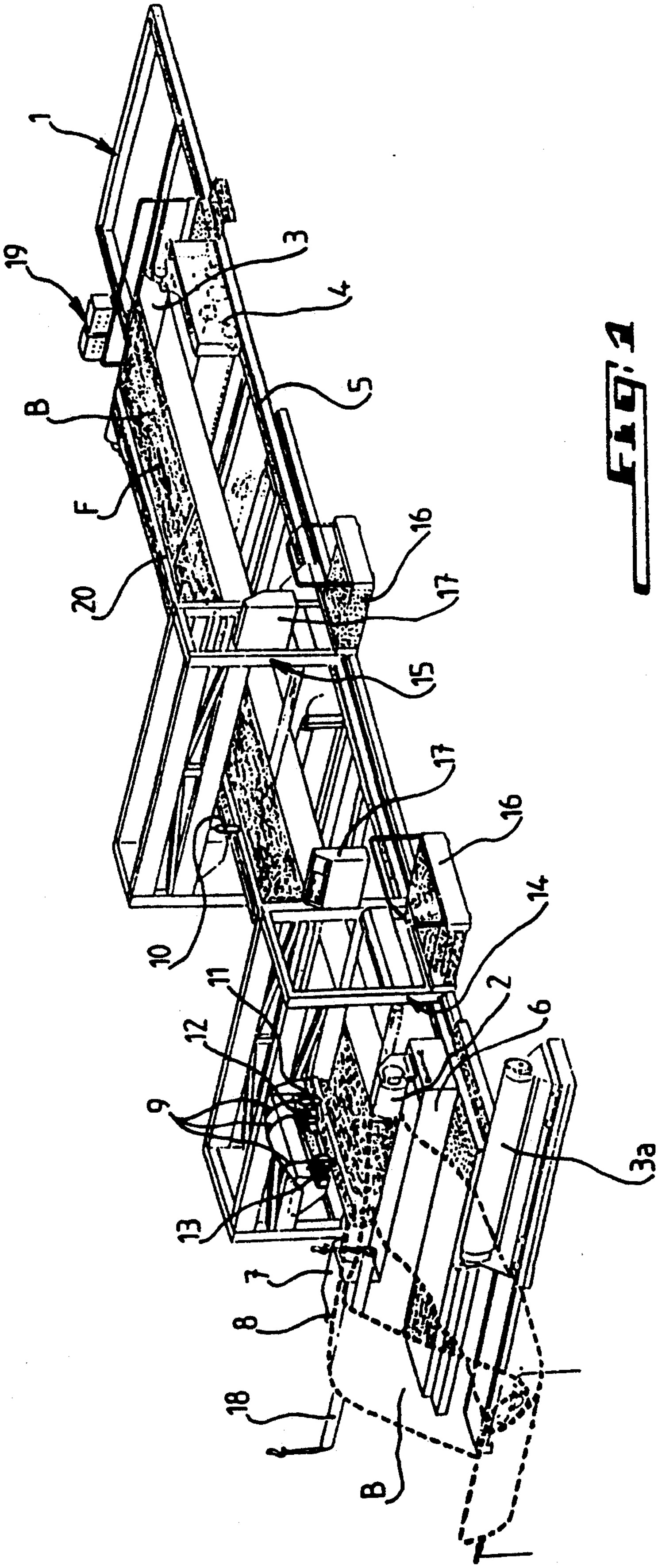
FIG. 1 is a diagrammatic perspective view of a machine for controlling an endless belt according to the principles of the invention.

The belt B if its control proves to be satisfactory could be transferred onto a printing machine (not shown) or without departing from the scope of the invention the printing machine may be integrated into the control machine seen on FIG. 1.

This control machine comprises a frame 1 supporting two cylinders or rolls allowing to drivingly rotate the belt B in the direction of the arrow F, namely a powered or front cylinder 2 and a rear or pulling cylinder 3.

The rear cylinder 3 is removably mounted onto a self-pulled carriage 4 meshing with a toothed rack 5 made fast to the frame 1. The front cylinder 2 is removably mounted onto a support 6 secured by any suitable means onto the frame 1 of the machine. Onto this stationary support is mounted a motor 7 for drivingly rotating the cylinder 2 and an encoder 8 is mechanically connected to the shaft of the motor 7.

Figure 2:
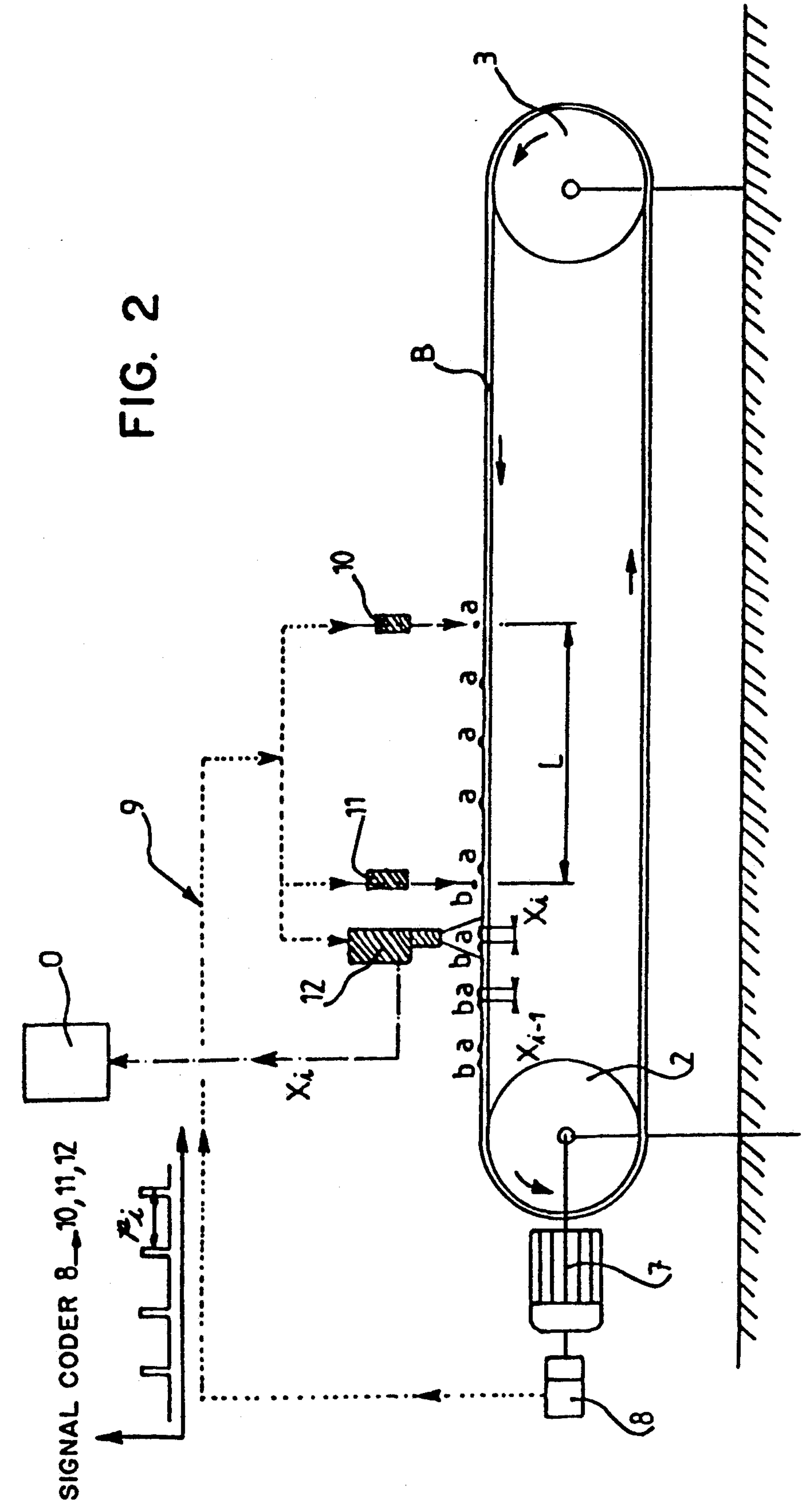
FIG. 2 is a diagram illustrating a first operating mode of this machine.
Figure 3:
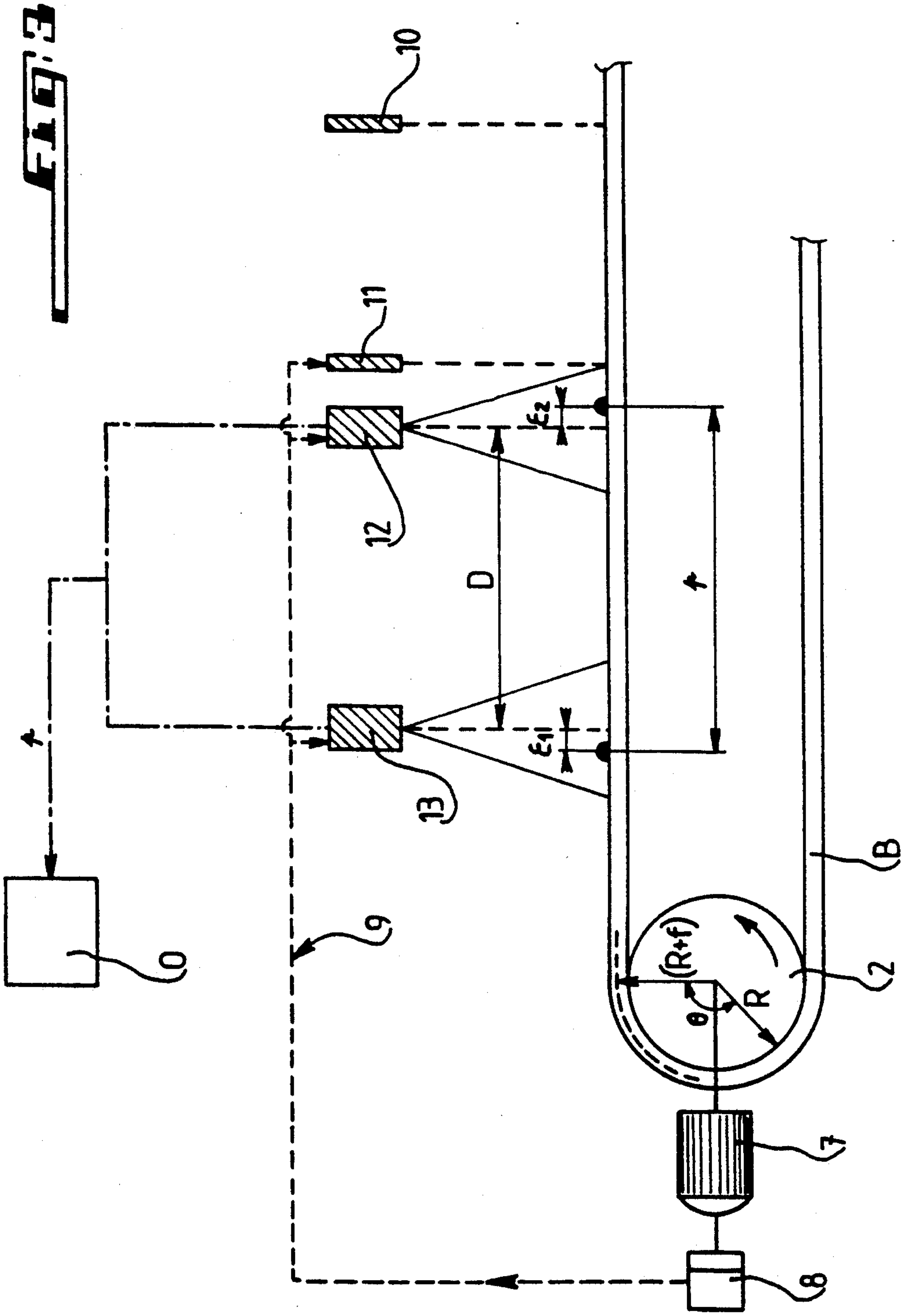
FIG. 3 is a diagram illustrating a second operating mode of the machine.

The encoder 8 is electrically connected by a wiring 9 to two systems 10, 1 1 for injecting a colorant surch for instant as ink and to two video-cameras 12, 13 as is well seen on FIGS. 1, 2 and 3.

At 14 on FIG. 1 has been shown a first gantry located towards the front or powered cylinder 2, this gantry supporting by any suitable means both cameras 12, 13 and one 11 of both colorant injection systems. The other colorant injection system 10 is made fast to a second gantry 15 which quite as the gantry 14 is provided with an access 16 and with a control desk 17.

The gantries 14 and 15 are mounted in rolling or sliding relationship on the frame 1 of the machine and the injection systems 10 and 11 as well as the cameras 12 and 13 are carried by these gantries above and plumb with the endless belt B, it being understood that the self-pulled carriage 4 may pass underneath the said gantries 14, 15 as will be described later.

A computer O diagrammatically shown on FIGS. 2 and 3 and connected to the video-cameras 12 and 13 allows the calculation of the registering inaccuracy and of the position of the neutral axis of the belt B as will be described in detail hereinafter.

Now will be explained at first by means of FIG. 1 how an endless belt B to be controlled on the machine just described is positioned.

Both gantries 14 and 15 are moved backwards on the frame 1 towards the right end on this Figure and the self-propelled carriage 4 supporting the rear cylinder 3 is moved forward on the frame 1 while passing underneath the gantries 14 and 15 towards and relatively close to the support 6 carrying the powered cylinder 2.

This powered cylinder 2 is separated with one of its ends from the support 6 and the endless belt B to be controlled (shown in dotted lines on the left-hand part of FIG. 1) is threaded onto the cylinder 2 which is then put back in position onto its support 6.

Then by means of an air cushion or like appliance the rear cylinder 3 previously removed from the carriage 4 is threaded inside of the belt B as seen at 3*a* on FIG. 1.

Then an overhead travelling crane, hoisting gear or the like diagrammatically shown at 18 is used for fitting the rear cylinder 3 (or 3*a*) threaded into the belt B again onto the self-pulled carriage 4 located very close to the support 6 bearing the front cylinder 2. The belt B being thus positioned, i.e. surrounding the cylinders 2 and 3 both gantries 14 and 15 are moved back towards the left on FIG. 1 into the position seen on this Figure while passing over the belt B. Then the carriage 4 is brought back towards the right on FIG. 1 to assume the position seen on this Figure, it being understood that the belt B will be stretched owing to the carriage 4. The tensioning of the belt will be adjusted by means of jacks (not shown) by an operator which will control the prescribed tension value on indicators designated at 19 on FIG. 1.

After having performed a first travelling test with the belt B for adjusting the guiding and to run in the belt, the control steps which will be described hereinafter with more particular reference to FIGS. 2 to 4 will be carried out.

The cloth having been run in, the edges are cut off and the length is approximately measured with an approximation of more of less one centimeter thereby subsequently allowing to determine a number of regular measurement intervals, each interval being about 1 meter.

A strip of adhesive film 20 well seen on FIG. 1 is stuck onto the endless belt B in order to serve as a printing support for the ink drops issuing from the injection systems 10 and 11.

Figure 4:
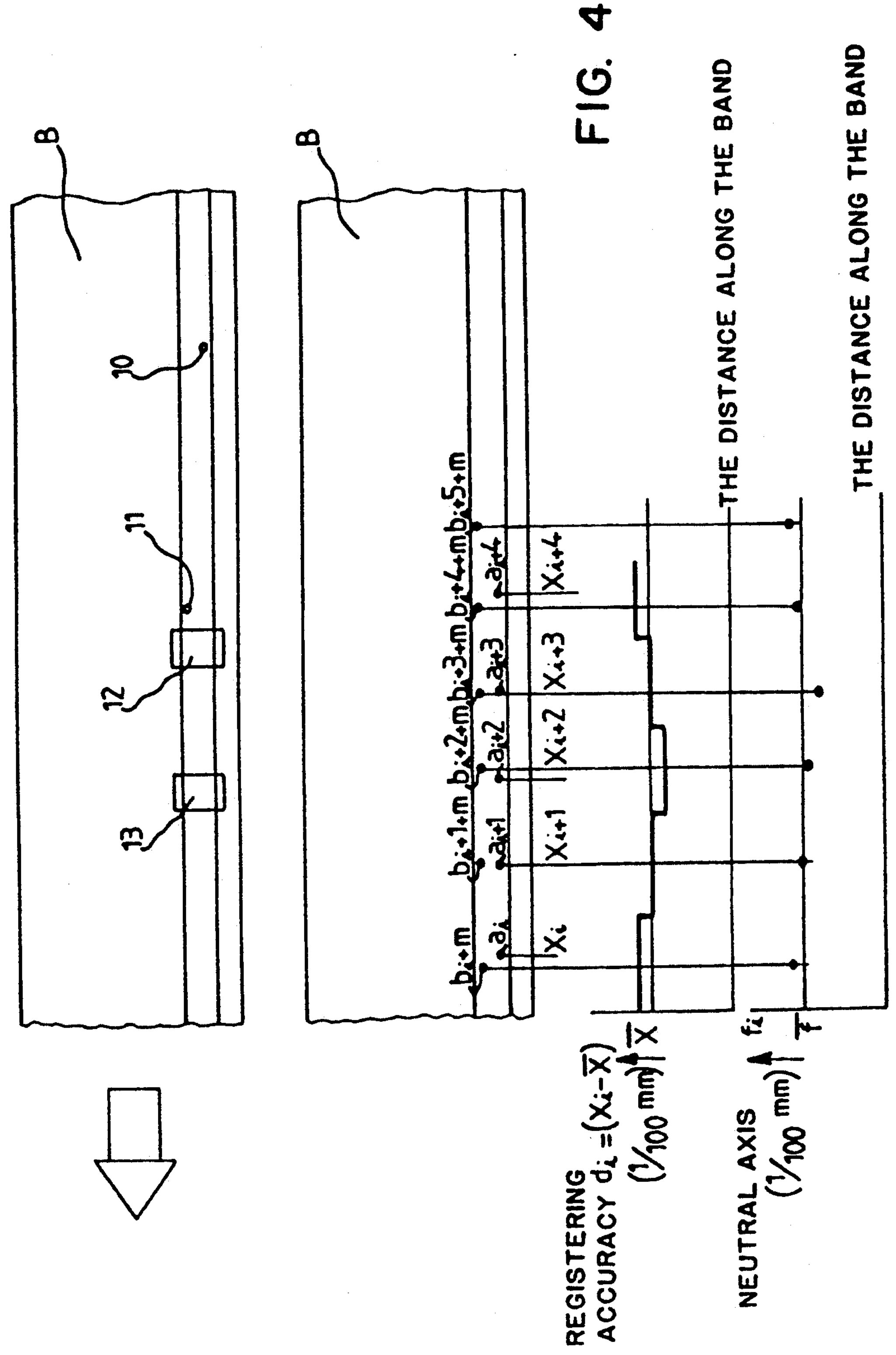
FIG. 4 is a partial plan view of the endless belt such as it appears on the screen of the computer with values of registring inaccuracy and of neutral axis measured for a certain belt length.

When this has been done, the measurement of the registering inaccuracy and of the neutral axis could be carried out simultaneously, both measurements having been described hereinafter with reference at first to FIG. 2 with respect to the registering inaccuracy and then to FIG. 3 with respect to the neutral axis, it being understood that FIG. 4 shows the results for both measurements.

It should be pointed out here that the system is originally designed to give 900,000 points of the encoder 8 per revolution of the drive cylinder 2. Thus the encoder 8 would deliver to the injection systems 10 and 11 for each displacement $i_i$ of the belt B, the order for simultaneously printing a drop a, b onto the cloth and thereafter the registering inaccuracy generated by the irregularities of the belt will be controlled by the camera 12 downstream of the injection system 11.

More specifically the spacings $X_i$ between two drops a, b are measured by the camera 12 connected to the computer O in which has been stored each value of spacing between two drops.

It should be noted here that the injection systems 10 and 11 are somewhat shifted transversely of the belt as is seen in the upper part of FIG. 4. Thus in case of total absence of any registering inaccuracy one drop $a_i$ of the injection system 10 should lie exactly at the same place on the belt B as the drop $b_{i+m}$ coming from the injection system 11, m being equal to the number of intervals L of 1 meter between the systems 10 and 11.

The computer would calculate the average value of the various spacings X i as measured by the camera 12, i.e.:

$$\overline{X} = \frac{1}{n} \sum_{i=1}^{n} X_i$$

And the computer O will effect the difference between the spacing $X_i$ instantly measured by the camera 12 and the aforesaid mean value of the spacings $\overline{X}$ to give the value $d_i$ of the registering inaccuracy, that is:

$$d_i = X_i - \overline{X}$$

As is seen on FIG. 4 the screen of the computer O will display as a graphic the different values of $d_i$ according to the position of the belt B. There is perfectly seen on the curve illustrating the value of the registering inaccuracy versus the distance along the belt B that the registering inaccuracy is zero for two drops a, b lying exactly at the same place whereas it is displayed as being positive or negative for a certain shift of these drops. It is important to say here that with the system of the invention it will be possible to measure the registering inaccuracy with sufficient precision for making possible to pertinently detect a registering inaccuracy of 0.1 mm.

Reference should now be had to FIG. 3 for describing the measurement of the position of the neutral axis f within the belt B.

Here will be used one single ink injection system, namely the system 11 and both identical video-cameras 12 and 13 with simultaneous readings which are mounted on the gantry 14 above the cloth B and spaced by a distance D=1,000 mm. It is possible to use a standard ruler (not shown) which will allow to very precisely know the distance D between these two cameras.

Thus when the cloth is moving the cameras 12 and 13 may precisely measure the value p which is the distance between two successive drops deposited by the ink injection system 11.

Thus is obtained the equation:

$$p = \sigma(R+f),$$

wherein:

p is measured by both cameras 12 and 13 and as is well seen on FIG. 3 is equal to: $D+\epsilon_1+\epsilon_2$ R which is the radius of the drive cylinder 2 is known of course and constant;

$\sigma$ which is the angle of rotation of the drive cylinder 2 corresponding to p is also itself known and constant since it is set by the encoder 8.

With these conditions it therefore is possible to calculate the value of the neutral axis, that is:

$$f = \frac{p}{\theta} - R$$

The purpose is indeed to determine the position or the mean value of the neutral axis f which constitutes a particularly useful parameter for the operators using fabric printing machines with an endless belt of the kind of those presently considered.

Therefore the system according to the invention will give the instant and individual values $f_i$ of the neutral axis in accordance with the position of the cloth B and the computer O will calculate and give the average value of the neutral axis, that is:

$$\overline{f} = \frac{\Sigma f_i}{n}$$

All this will be shown on the screen of the computer O as illustrated in the lower part of FIG. 4 where the mean value of the neutral axis f is given versus the distance along B.

Owing to the system according to the invention it will be possible to measure the mean position of the neutral axis with an accuracy of more or less 5/100 mm.

There has therefore been provided according to the invention a method of and a machine for continuously controlling an endless belt of a fabric printing machine, this method and this machine permitting the measurement with a great precision of the registering inaccuracy and of the mean position of the neutral axis of the belt.

It should be understood that the invention is not at all limited to the embodiments described and illustrated which have been given by way of example only.

Thus the equipement of the machine according to the invention will in particular comprise ink injection systems, video-cameras and an encoder having a high precision and a high resolution so as to obtain the required precision in the results of the measurement and to thus guarantee the users of fabric printing machines against any belt defect which would be detrimental to the printing of the fabrics.

Likewise the machine according to the invention could be incorporated into or combined with a fabric printing machine in any suitable manner whatsoever.

Therefore the invention comprises all the technical equivalents of the means described as well as their combinations if the latter are carried out according to its gist.

We claim:

1. A method for controlling a continuous belt upon which fabrics are mounted to receive successive printings, comprising the steps of:

driving a tensioned continuous belt at a constant rate around at least two rollers spaced apart from each other;

marking the belt while it is being driven to obtain successive marks; and measuring distances between said successive marks while said belt is being driven.

2. The method of claim 1 further comprising the step of altering the rate of belt movement in accordance with distances being measured.

3. The method of claim 1 wherein said marking step further comprises providing an ink injector operative to mark said belt with successive ink drops.

4. The method of claim 1 wherein said marking step further comprises providing an ink injector operative to mark said belt with successive ink drops and attaching to said belt a film strip operative to receive said successive ink drops.

5. The method of claim 1 wherein said measuring step includes using at least one camera.

6. The method of claim 1 wherein said marking step farther comprises providing ink injectors spaced apart from each other along the direction of belt movement, said injectors each operative to mark said belt with ink drops.

7. The method of claim 1 further comprising the steps of:

storing values in computer memory corresponding to measured distances between markings;

obtaining therefrom an average value of the measured distances between belt markings; and providing means for indicating the neutral axis position of the belt in accordance with said average value.

8. A system for controlling a continuous belt upon which fabrics are mounted to receive successive printings, comprising:

a frame;

at least two rollers spaced apart from each other and rotatively disposed upon said frame;

a continuous belt disposed rotatively around and tensioned between said rollers;

means for driving at least one of said rollers whereby said continuous belt is rotatively driven;

means for marking said belt to obtain successive marks while said belt is rotatively driven; and means for measuring distances between said successive marks thereon while said belt is rotatively driven.

9. The system of claim 8 wherein said marking means comprises an ink injector operative to mark said belt with a a succession of ink droplets.

10. The system of claim 8 wherein said marking means comprises two ink injectors operative to mark said belt with a succession of ink droplets, said ink injectors being spaced apart from each other along tile direction in which said belt is rotatively driven by said driving means.

11. The system of claim 8 wherein said measuring means comprises at least one camera operative to measure the distances between said marks.

12. The system of claim 8 wherein said measuring means comprises computer memory operative to store values corresponding to distances between said successive marks and to provide an indication of the average of said stored values.

13. The system of claim 8 further comprising at least one gantry for mounting said marking means.

14. The system of claim 8 further comprising at least one gantry for mounting said measuring means.

15. The system of claim 8 further comprising at least two gantries moveably mounted to said frame, the first of said gantries operative for mounting thereupon a first ink injector marker, and the second of said gantries operative for mounting thereupon a second ink injector marker.

16. The system of claim 8 wherein at least one of said rollers is removeably mounted upon said frame.

17. The system of claim 8 further comprising a strip attached to said roller, said strip aligned with and operative to receive successive markings from said marking means.

18. The system of claim 8 further comprising means for altering the rate of said driving means in response to said measuring means.

19. The system of claim 8 wherein said driving means comprises a motor having a shaft for rotating one of said rollers whereby said band is rotatively moved; and further comprising an encoder connected to said shaft and having an output corresponding to predetermined rotation of said motor shaft; said marking means comprising at least two ink injectors disposed apart along the direction of belt movement, said injectors operative to mark said band with ink droplets in response to said encoder output; at least one camera operative to measure distances between markings and operative to provide output values correponding to measured distances; and a computer for storing said output values, averaging said values to obtain an average value, correlating said average value, and providing an indication of said correlated value.

* * * * *